United States Patent [19]

Croopnick et al.

[11] Patent Number: 4,557,836
[45] Date of Patent: Dec. 10, 1985

[54] SOLID DISCHARGE MECHANISM FOR DEWATERING SYSTEM

[75] Inventors: Gerald A. Croopnick, Trabuco Canyon; John M. Zabsky, Santa Ana, both of Calif.

[73] Assignee: Dresser Industries, Inc., Dallas, Tex.

[21] Appl. No.: 332,458

[22] Filed: Dec. 21, 1981

[51] Int. Cl.[4] ............................................. B01D 33/06
[52] U.S. Cl. .................................. 210/287; 210/104; 210/111; 210/374; 210/375
[58] Field of Search .............. 210/369, 371, 372, 374, 210/375, 515, 518, 533, 537, 97, 103, 104, 105, 109, 111, 112, 787

[56] References Cited

U.S. PATENT DOCUMENTS 2,379,411  7/1945  Berges ................................ 210/537

Primary Examiner—Frank Sever
Attorney, Agent, or Firm—Freilich, Hornbaker, Rosen & Fernandez

[57] ABSTRACT

A particle discharge mechanism is described for use on a centrifugal dewatering system, which is of relatively simple and rugged construction. The discharge mechanism includes a pair of concentric ring-like gates (50, 52 in FIG. 2) that can move across a particle discharge passageway (46) extending around a rotating vessel (14). The gates are operated in a sequence to first trap a mass of particles inside the radially outermost gate (52), to close an innermost gate (50) to isolate the trapped particles, and then to open the outermost gate (52) to release the trapped mass. In one procedure, the outermost gate is opened only slightly prior to complete particle release, to remove small amounts of remaining water in the mass of particles.

14 Claims, 11 Drawing Figures

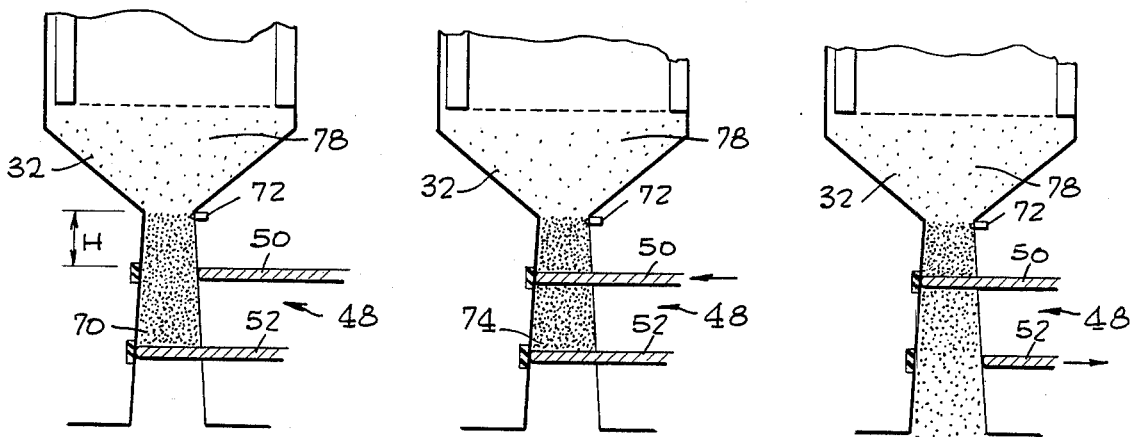
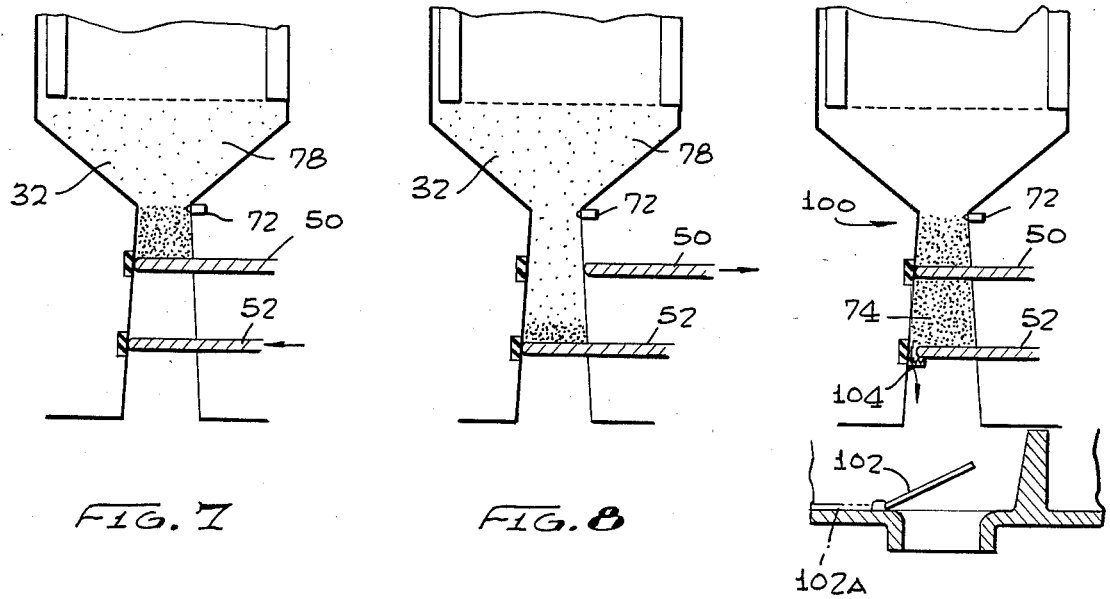
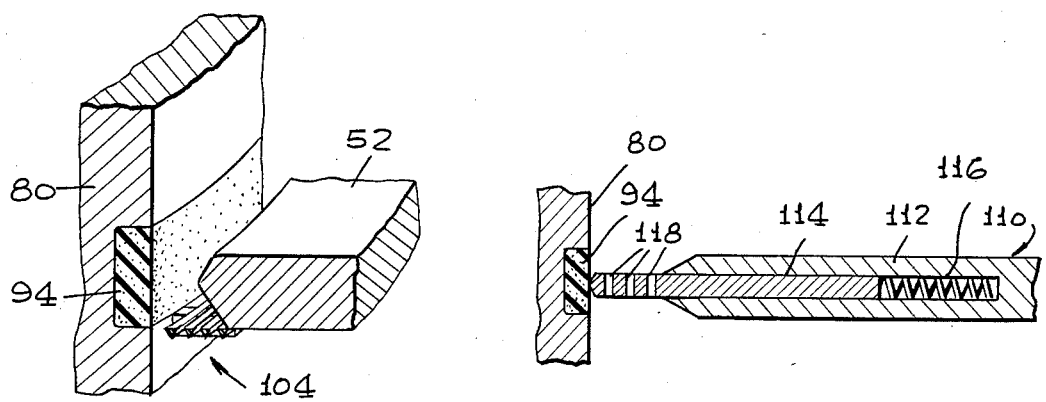

SOLID DISCHARGE MECHANISM FOR DEWATERING SYSTEM

BACKGROUND OF THE INVENTION

One type of dewatering mechanism for separating a liquid such as water, from a slurry such as coal slurry, described in U.S. Pat. No. 4,246,108 by Croopnick et al., uses a rotating circular chamber that rotates about the axis of the circle to aid in the separation. The slurry is fed to a radially outer region of the chamber where water and fines flow radially inwardly past a screen, and where larger particles settle to the periphery of the region from which they can be removed. If the settled particles are allowed to escape too rapidly from the periphery of the separating region, then water and fines may flow with them. Mechanisms such as screw feeders can be used to produce a controlled discharge of particles, but such mechanisms cannot be easily adapted to cover a large curved area extending 360° around the rotating circular chamber. A discharge mechanism which could control the discharge of particles from a fluid-particle separator, which was of relatively simple construction and yet which could cover a large curved area, would be of considerable value in systems for separating the fluid and particles out of a slurry.

SUMMARY OF THE INVENTION

In accordance with one embodiment of the present invention, apparatus is provided for controlling the discharge of particles from a fluid-particle separator system, which is of relatively simple construction and yet which can cover a large discharge area. One apparatus for use with a separator having a rotating chamber extending in a circle about the axis of rotation, includes a gate mechanism having a pair of concentric but radially-spaced ring-like gates located along a passageway leading from the periphery of the chamber. An actuator assembly connected to the gates, move them axially, both forwardly across the passageway and rearwardly therefrom. The actuator assembly moves the gates in a sequence that isolates the mass of particles lying in the passageway from the chamber, and then releases only the mass of particles lying between the gates to let them fly out of the rotating apparatus.

A sensor can be used to sense the buildup of particles behind a gate mechanism, and to operate the gate mechanism to control the rate of discharge of particles so that the mass of particles is prevented from building up beyond a predetermined height. Where a pair of concentric gates are utilized, the sensor can be positioned a small distance inwardly of the innermost gate. Upon the detection of the buildup of particles to the height of the sensor, the actuators can be operated to move the gates in a predetermined cycle. The actuators close the innermost gate, open the outermost gate to discharge the quantity of particles lying between the gates, close the outermost gate, and then open the innermost gate to begin a new buildup of particles.

The novel features of the invention are set forth with particularity in the appended claims. The invention will be best understood from the following description when read in conjunction with the accompanying drawings.

DESCRIPTION OF THE DRAWINGS

FIGS. 4–8 are simplified sectional views similar to that of FIG. 3, and showing the discharge mechanism in various stages of its operation.

FIG. 9 is a partial simplified sectional view of a portion of a discharge mechanism constructed in accordance with another embodiment of the present invention.

FIG. 10 is a perspective view of a portion of the mechanism of FIG. 9.

FIG. 11 is a partial sectional view of a discharge mechanism constructed in accordance with another embodiment of the invention.

DESCRIPTION OF THE PREFERRED EMBODIMENTS

Figure 1:
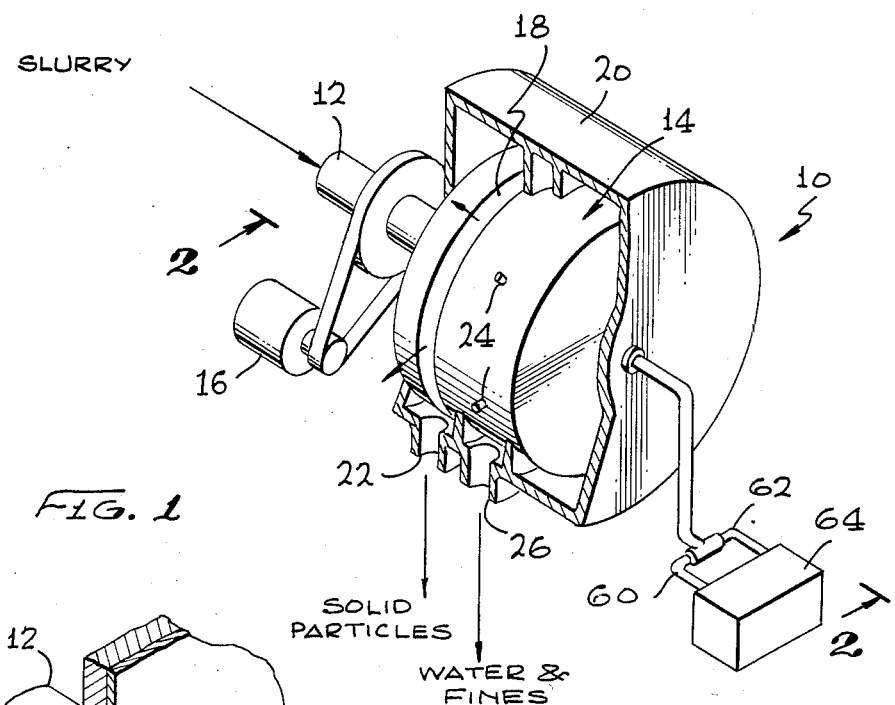
FIG. 1 is a perspective view of a dewatering system constructed in accordance with the present invention.

FIG. 1 illustrates a dewatering apparatus 10 which uses centrifugal force to aid in the separation of particles from an entraining fluid. In one application, a coal slurry is pumped through a hollow shaft 12 leading to a rotating cylindrical vessel 14 that is rapidly rotated by a motor 16. The larger coal particles of the slurry exit the rotating vessel through passageway 18, to be recieved by a stationary enclosure 20 with a coal particle exit 22. Water and fines (small particles) leave the rotating vessel through nozzles 24, and leave the enclosure through an opening 26.

Figure 2:
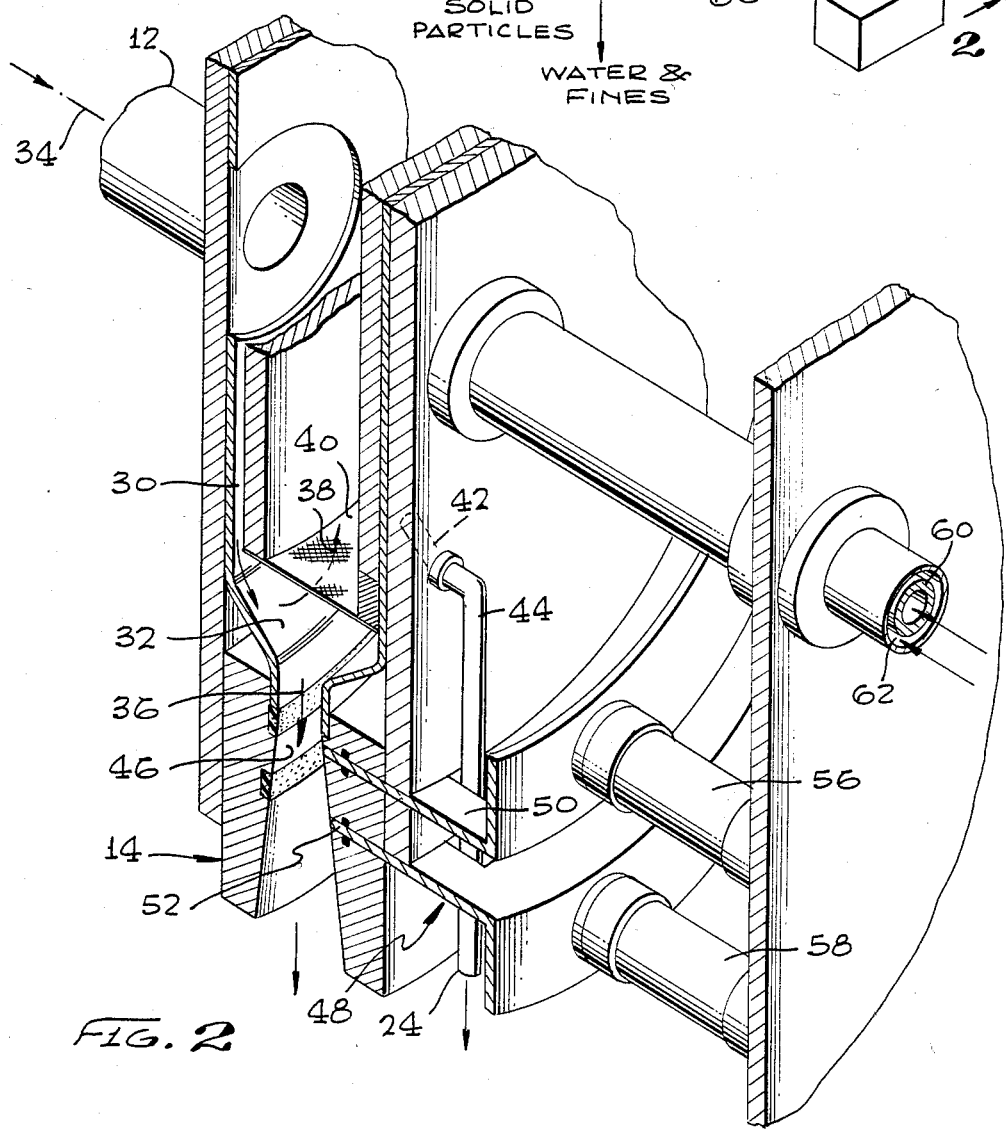
FIG. 2 is a partial sectional view taken in the line 2—2 of FIG. 1.

As shown in FIG. 2, the incoming slurry passes through the hollow shaft 12 and moves radially outwardly through a space 30 into a separation chamber 32. The separation chamber 32 is of annular shape in that it extends 360° around the axis 34 of the rotating vessel 14. As the slurry enters the chamber 32, the water and fine particles carried by fluid drag forces tend to move radially inwardly, as indicated by arrow 38, through a screen 40. The water and fines leave the inner side of the screen through a conduit 42 which includes a pipe 44 leading to a nozzle 24. Larger coal particles cannot pass through the screen 40, and the centrifugal force settles these larger particles along arrow 36 to the radially outer portion of the rotating chamber. The settling particles move radially outwardly through a passageway 46, past a gate mechanism 48, to the nonrotating enclosure where they are captured.

The gate mechanism 48 is operated to control the rate at which particles can exit through the passageway 46, so that the particle exit rate is neither too fast nor too slow. If the exit rate is too fast, then substantial amounts of water will flow out through the passageway 46 along with the settling particles. If the flow rate is too slow, then large particles will build up in the chamber 32 and block the screen 40.

The gate mechanism includes a pair of gates 50, 52 that can move in an axial direction, parallel to the axis of rotation 34, to pass across the passageway 46 so as to block it, and then to retract therefrom to unblock the corresponding location along the passageway. Each of the gates 50, 52 extends like a ring, 360° around the axis 34 of the vessel 14 to block or unblock the entire ring-like passageway 46. The inner gate 50 is moved back and forth by a group of pneumatic actuators 56 that are spaced along the ring, while the outer gate 52 is operated by another series of pneumatic actuators 58 that are spaced about it. The actuators are powered by compressed air delivered through passages 60, 62 from a control apparatus 64 (FIG. 1).

FIGS. 4-9 illustrate the sequence of operation of the gate mechanism 48 in controlling the outflow rate of particles 70 from the separation chamber 32. FIG. 4 shows that the particles initially are allowed to build up to a height H above the innermost gate of the gate mechanism, so that almost all water has been excluded from the particles lying at the height of the innermost gate 50. A sensor 72 is utilized to detect when the mass of particles has reached the height H. Prior to that time, the outermost gate 52 has been fully closed so that no particles exit from the passageway.

FIG. 5 shows a first step in the cycle of operation for removing particles, wherein the innermost gate 50 is closed to trap the outermost portion 74 of the mass of particles, between the gates. FIG. 6 shows a next step in the operation, wherein the outermost gate 52 is opened to release the trapped particles to fly into the surrounding container where they can be collected. FIG. 7 shows a next step in the operation, wherein the outermost gate 52 is closed. FIG. 8 shows a final step, wherein the inner gate 50 is opened, to allow the remaining portion 76 of the mass of particles in the stack to move outwardly and to begin the buildup of another mass of particles up to the level of the sensor 72.

The sensor 72 is a thermistor, which is a semiconductor diode having the usual large temperature-dependent resistance. The thermistor 72 is energized with appreciable current so that it becomes heated to a temperature significantly above that of the slurry 78 fed into the chamber 72. Thus, the moving fluid around the thermistor at 72 will cool the thermistor to increase its resistance, when the space about the thermistor is not packed with settled particles. However, when the height of settled particles reaches the thermistor, so that fluid cannot readily circulate past the thermistor, the temperature of the thermistor suddenly rises, which can be detected by the rapid decrease in the resistance of the thermistor. The detection of a drop in resistance of the thermistor is utilized by the control 64 (FIG. 1) to initiate the cycle of operation of the gate mechanism shown in FIGS. 4-8, to release the quantity of particles lying between the gates.

If there is a high flow rate of slurry into the chamber 32, so particles build up rapidly, then the gate mechanism will be operated at short intervals to release the particles at a rapid average rate, over an extended period of time. This will prevent the particles from rising considerably above the level of the thermistor 72, although the height of the mass will repeatedly reach the thermistor. If the particles are deposited at a low rate, the system will automatically cycle the gate mechanism at long enough intervals so that the rate of particle discharge is slow enough to still allow the particles to repeatedly reach the level of the thermistor 72 but considerably beyond it.

Figure 3:
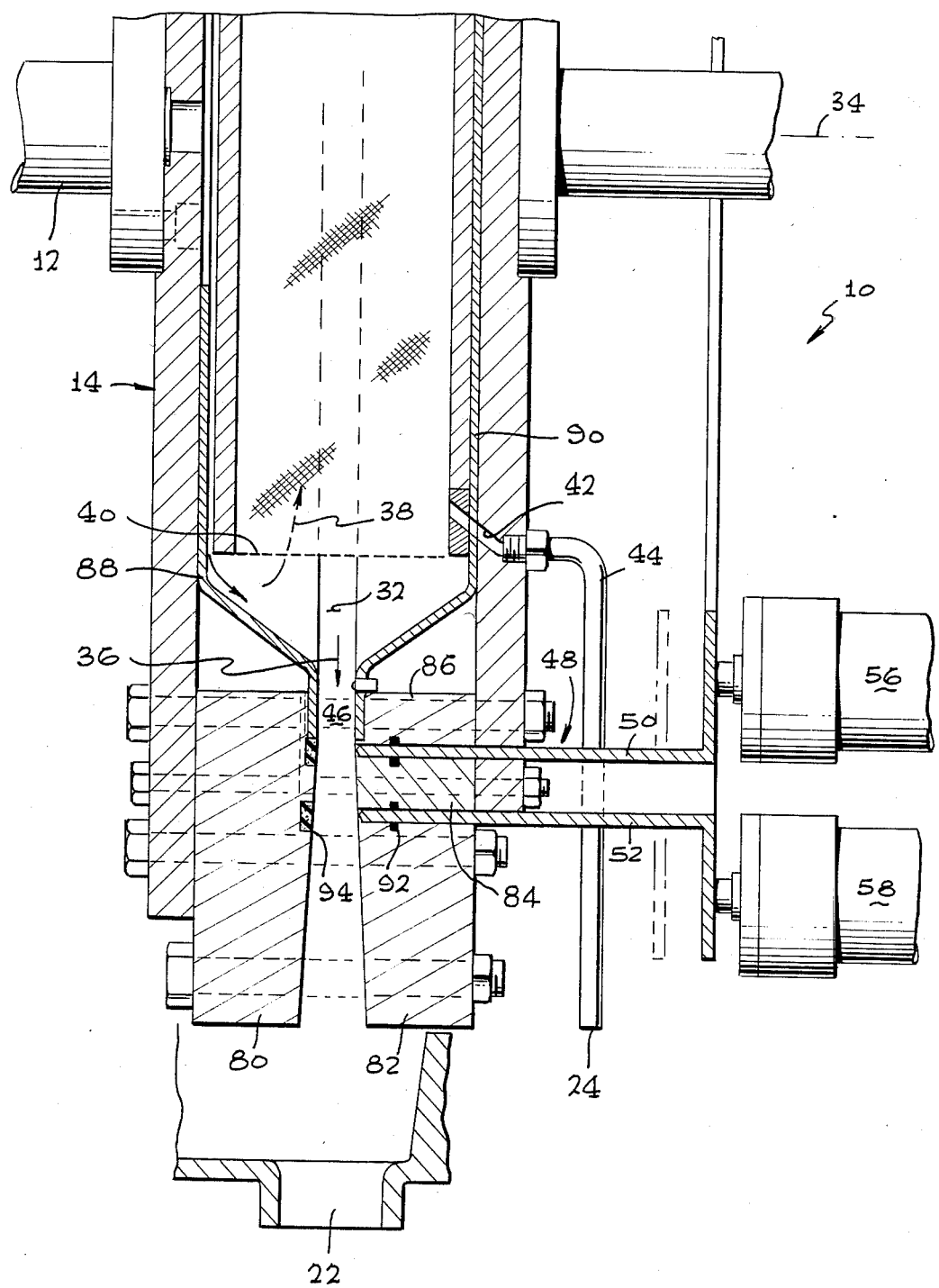
FIG. 3 is a sectional view of a portion of the system of FIG. 2.

As shown in FIG. 3, the rotating vessel 14 includes one larger frame ring 80 on one side of the passageway 46, and three additional frame rings 82, 84, and 86 on the other side of the passageway. A pair of bent plates 88, 90 form the separation chamber 32 and the innermost portion of the passageway 46. The gates 50, 52 slide through spaces between the frame rings 82-86 and are sealed thereto by pairs of O-rings 92. In order to more completely seal the passageway, the frame ring 80 is formed with a pair of cutouts 94 that contain urethane seal rings. The cutouts 94 are machined in the ring 80, and urethane is cast into the cutouts. The tips of the gate press against the elastomeric urethane seal rings.

FIG. 9 illustrates a modified dewatering or separation apparatus 100, which can be operated to remove additional amounts of fluid from the quantity of settled particles 74 lying between the gates 50, 52 before the discharge of these particles. This is accomplished by utilizing the procedure of FIGS. 4 through 8, except that after the step of FIG. 5, when both gates are fully closed, the outer gate 52 is opened only slightly. This allows some of the small amount of fluid still in the particle mass 74 to flow outwardly, while preventing outward flow of the particles. The fluid is diverted by a diverter 102 to an auxiliary fluid outlet (not shown) during such fluid release, and the diverter 102 is then stored at the position 102A.

The outer gate 52 can then be opened to allow the more completely dewatered particles to exit from the passageway. As shown in FIG. 10, a bar screen 104 is positioned adjacent to the gate 52, to prevent the exit of particles while permitting the outflow of considerable amounts of trapped fluid when the outer gate 52 is partially opened.

FIG. 11 shows another outer gate 110 which can be used in the procedure of FIG. 9 to dewater trapped particles, the gate 110 being shown in a slightly opened position. The gate 110 includes a main gate frame 112 with a slot therein along which a screen member 114 can slide. A group of springs 116 urge the screen member towards the elastomeric striker 94, so that when the gate is slightly opened only the outer end of the screen member 114, which contains multiple holes 118, is extended to permit the passage of fluid therethrough.

Thus, the invention provides an apparatus and method for separating fluid-entrained particles from the fluid, which is of relatively simple construction even where the chamber and passageway through which particles must exit is of annular form so that a long, thin, circular area must be gated. The apparatus can basically include a sensing device which senses the height of the mass of particles in a chamber lying inward of a gate mechanism, and an actuator for operating a gate mechanism to discharge particles at an average rate that allows the particles to build up at least repeatedly to a certain height but which prevents the mass of particles from exceeding that height. The gate mechanism can be formed by a pair of concentric but radially-spaced ring-like gates that are operated by actuator assembly that move them axially in a predetermined sequence that is controlled to isolate and then release the mass of particles that lies in the passageway between the two gates.

Although particular embodiments of the invention have been illustrated herein, it is recognized that modifications and variations may readily occur to those skilled in the art and consequently, it is intended that the claims be interpreted to cover such modifications and equivalents.

What is claimed is:

1. In an apparatus for centrifugally separating fluid-entrained particles, which include walls forming a circular chamber that rotates about its axis, and forming a ring-like passageway extending from the chamber, the improvement comprising:

a pair of concentric but radially-spaced ring-like gates;

an actuator assembly connected to said gates to move them axially forward across said passageway and rearwardly to retract them therefrom; and control means for operating said actuators assembly to move said gates in a predetermined sequence that isolates and then releases material lying in the passageway between the gates.

2. The improvement described in claim 1 including:
a fluid sensor mounted in said chamber radially inside the radially innermost gate and connected to said control means, said control means constructed to begin said sequence upon the detection of low fluid content by said sensor.

3. The improvement described in claim 1 including:
screen means located adjacent in said outer gate, at least when said outer gate is primarily closed, for draining fluid while retaining large particles, and said control is constructed to open said outer gate only slightly, while said inner gate is closed, to drain out fluid remaining between the gates, prior to more fully opening said outer gate.

4. The improvement described in claim 1 wherein:
the walls that form the opposite sides of said passageway include a first wall with slots through which said gates pass, and an opposite second wall which the gates approach when they close; and
said second wall including a groove opposite at least one of said gates, and a quantity of elastomeric material cast in the groove to completely fill it to a level that is substantially even with the surface of the second wall.

5. Apparatus for centrifugally separating fluid-entrained particles from the fluid, comprising:
walls forming a chamber having an axis of rotation, a fluid conduit connected to said chamber to feed a slurry into it, a passageway extending radially away from said chamber, and means at the radially inward side of said chamber for carrying away fluid;
means for rotating said chamber about its axis;
a pair of gates positioned to move across said passageway and retract therefrom, including an inner gate closest to said chamber and an outer gate furthest therefrom; and
actuator means for moving said gates in a predetermined sequence to first close said inner gate at a time when said outer gate is closed to trap particles between them, to open said outer gate to release the trapped particles, to close the outer gate, and then to open the inner gate;
said chamber and passageway each being of annular shape, said inner and outer gates are each of ring-like shape, and the walls of said passageway are divergent in a radially outer direction as seen in a sectional view taken on a plane that passes through said axis of rotation.

6. In apparatus for separating fluid-entrained particles from the fluid, which includes a chamber with inner and outer portions and a passageway extending from the outer portion of the chamber, the improvement comprising:
a pair of gates positioned along said passageway, including inner and outer gates respectively closest and furthest from said chamber, each gate having a leading edge;
an actuator means for moving each of said gates so its leading edge moves across said passageway and for retracting the gate; and
screen means lying near the leading edge of the outer gate at least when the outer gate is closed, for stopping the outward movement of particles while permitting the outward movement of liquid from the space between the gates.

7. Apparatus for separating particles from the particle-entraining fluid of a slurry, comprising:
walls forming a chamber with an entrance opening for receiving a slurry, an inner side with an opening for discharging fluid, an outer side which passes particles that settle out of the slurry, and a passageway at said outer side for carrying away the particles;
a gate mechanism located along said passageway for controlling the rate of discharge of particles from said chamber;
means for sensing the height of the mass of particles in said chamber lying inward of said gate mechanism; and
actuator means responsive to said sensing means for operating said gate mechanism to discharge particles at a rate that prevents the mass of particles from building up beyond a predetermined height inside said gate while always retaining a portion of the mass of particles and allowing the mass of particles to at least repeatedly approach said predetermined height.

8. The apparatus described in claim 7 wherein:
said gate mechanism is constructed so it can operate cyclically to release a quantity of particles which is less than the total height of the mass of particles at each cycle of operation; and
said actuator means is constructed to cycle said gate mechanism whenever said sensing means senses that said mass of particles has reached said predetermined height, and to allow the buildup of particles between each cycling of said gate mechanism.

9. The apparatus described in claim 7 wherein:
said chamber is of largely cylindrical shape with said passageway at its periphery;
said gate mechanism includes inner and outer concentric circular gates of different radii at locations spaced along said passageway, each gate being moveable across said passageway and retractable therefrom; and
said actuator means is constructed to move said gates, in response to the sensing of said predetermined height of the mass is particles by said sensing means, in a cycle that isolates the quantity of particles lying between the gate locations, releases said quantity of particles from said passageway, and then permits the entrance of additional particles into the space between said gate locations.

10. A method for centrifugally separating fluid-entrained particles from the fluid, comprising:
feeding said fluid into a rotating vessel that includes a chamber, a screening device at a side of the chamber that is closest to the axis of rotation for passing primarily fluid, and a passageway extending from the side of the chamber that is furthest from the axis of rotation, so that larger particles tend to settle into the passageway;
leaving open an inner first location of said passageway which is closest to said chamber, while blocking a second passageway location outward therefrom, to build up a mass of particles inwardly of said second location;
at intervals when a mass of particles of a height larger than the distance between said locations has built up behind said second location, closing said inner passageway location, then opening said second outer location to discharge a mass of particles, then closing the outer passageway location, and then opening the inner passageway location to allow another buildup of particles.

11. The method described in claim 10 wherein:
said step of opening said outer location to discharge a mass of particles includes only slightly opening said second outer location and allowing fluid but not particles to move past said outer location, and then fully opening said outer location to discharge particles.

12. The method described in claim 10 including:
sensing when the mass of particles reaches a height at which it extends to a predetermined position which is slightly inside said inner location,
and then performing said step of closing said inner passageway location.

13. A method of separating particles out of the particle-entraining fluid of a slurry and discharging the particles comprising:
flowing the slurry into a chamber, removing fluid from an inner side of the chamber, and allowing particles to continually settle into a passageway at the outer side of the chamber;
sensing the height of the mass of particles that builds up inward of a gate mechanism lying along the passageway; and
operating the gate mechanism to discharge said particles at a rate that allows the mass of particles to build up to a predetermined sensed height but substantially no higher.

14. The method described in claim 13 wherein:
said method of operating said gate mechanism includes releasing a portion of said mass which is less than the total height of the mass, whenever the height of the mass reaches said predetermined height, and allowing the mass of particles to build up inbetween each release.

* * * * *